United States Patent
Lang et al.

(10) Patent No.: US 11,263,111 B2
(45) Date of Patent: Mar. 1, 2022

(54) VALIDATING SOFTWARE FUNCTIONALITY

(71) Applicant: MicroStrategy Incorporated, Vienna, VA (US)

(72) Inventors: Timothy Lang, McLean, VA (US); Herminio Carames, Lansdowne, VA (US); Andrew Smith, Oakton, VA (US); Ying Ma, Falls Church, VA (US); Jun Peng, Great Falls, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/787,596

(22) Filed: Feb. 11, 2020

(65) Prior Publication Data
US 2020/0257612 A1 Aug. 13, 2020

Related U.S. Application Data

(60) Provisional application No. 62/803,882, filed on Feb. 11, 2019.

(51) Int. Cl.
*G06F 9/44* (2018.01)
*G06F 11/36* (2006.01)

(52) U.S. Cl.
CPC ...... *G06F 11/3612* (2013.01); *G06F 11/3664* (2013.01); *G06F 11/3688* (2013.01); *G06F 11/3692* (2013.01)

(58) Field of Classification Search
CPC ............ G06F 11/3612; G06F 11/3664; G06F 11/3688; G06F 11/3692
See application file for complete search history.

(56) References Cited

U.S. PATENT DOCUMENTS

| | | |
|---|---|---|
| 6,473,794 B1 | 10/2002 | Guheen |
| 6,691,067 B1 | 2/2004 | Ding |
| 6,816,871 B2 | 11/2004 | Lee |
| 6,934,934 B1 | 8/2005 | Baker et al. |

(Continued)

OTHER PUBLICATIONS

Wikipedia.com [online], "Computer performance" Dec. 2017, retrieved on Mar. 31, 2021, retrieved from URL <https://en.wikipedia.org/wiki/Computer_performance>, 5 pages.

(Continued)

*Primary Examiner* — Hang Pan
(74) *Attorney, Agent, or Firm* — Fish & Richardson P.C.

(57) ABSTRACT

Methods, systems, and apparatus, including computer programs encoded on a computer storage medium, for validating software functionality. In some implementations, data indicating a configuration of a first server environment running a third-party installation of a first version of an application is obtained. A second server environment is generated and is configured to run the first version of the application. The second server environment can be configured to use a set of configuration settings for the first server environment that are indicated by the data for the first server environment. An installer for a second version of the application to transition the second server environment to the second version of the application is run. Capabilities of the second version of the application are evaluated using a series of tests for the application on the second server environment.

19 Claims, 6 Drawing Sheets

(56) References Cited

U.S. PATENT DOCUMENTS

| | | | |
|---|---|---|---|
| 6,964,051 B1 | 11/2005 | Palaniappan | |
| 6,993,747 B1 | 1/2006 | Friedman | |
| 7,035,919 B1 | 4/2006 | Eisman et al. | |
| 7,047,177 B1 | 5/2006 | Lee et al. | |
| 7,051,098 B2 | 5/2006 | Masters et al. | |
| 7,089,347 B2 | 8/2006 | Mogi et al. | |
| 7,155,462 B1 | 12/2006 | Singh et al. | |
| 7,389,216 B2 | 6/2008 | Parent et al. | |
| 7,523,447 B1 | 4/2009 | Callahan et al. | |
| 7,552,438 B1 | 6/2009 | Werme | |
| 7,581,011 B2 | 8/2009 | Teng | |
| 7,617,486 B2 | 11/2009 | Sharma et al. | |
| 7,802,174 B2 | 9/2010 | Teng et al. | |
| 7,937,655 B2 | 5/2011 | Teng et al. | |
| 8,024,299 B2 | 9/2011 | Dias et al. | |
| 8,099,727 B2 | 1/2012 | Bahat et al. | |
| 8,554,918 B1 | 10/2013 | Douglis | |
| 8,595,364 B2 | 11/2013 | Levy et al. | |
| 8,595,714 B1 | 11/2013 | Hamer et al. | |
| 8,612,599 B2 | 12/2013 | Tung et al. | |
| 8,732,604 B2 | 5/2014 | Okamoto et al. | |
| 8,892,954 B1 | 11/2014 | Gray et al. | |
| 8,990,778 B1 | 3/2015 | Allocca et al. | |
| 9,047,017 B1 | 6/2015 | Dolan et al. | |
| 9,053,220 B2 | 6/2015 | Banks et al. | |
| 9,164,874 B1 | 10/2015 | Tonnay et al. | |
| 9,166,895 B1 | 10/2015 | Sivaraman | |
| 9,189,294 B2 | 11/2015 | Considine et al. | |
| 9,262,150 B2 | 2/2016 | Haserodt | |
| 9,268,663 B1 | 2/2016 | Siddiqui et al. | |
| 9,311,161 B2 | 4/2016 | Jagtap | |
| 9,424,172 B1 | 8/2016 | Helder | |
| 9,436,535 B2 | 9/2016 | Ricken et al. | |
| 9,491,072 B2 | 11/2016 | Raghunathan et al. | |
| 9,733,921 B1 | 8/2017 | Saenz et al. | |
| 9,762,450 B2 | 9/2017 | Xie | |
| 9,811,849 B2 | 11/2017 | Bursey | |
| 9,820,224 B2 | 11/2017 | Hui et al. | |
| 10,303,455 B2 | 5/2019 | Fitzgerald et al. | |
| 10,440,153 B1 | 10/2019 | Smith et al. | |
| 10,803,411 B1 | 10/2020 | Smith et al. | |
| 10,810,041 B1 | 10/2020 | Myers et al. | |
| 10,997,135 B2 | 5/2021 | Zoll et al. | |
| 11,102,330 B2 | 8/2021 | Gardner et al. | |
| 11,102,331 B2 | 8/2021 | Smith | |
| 2002/0065833 A1 | 5/2002 | Litvin | |
| 2002/0124243 A1 | 9/2002 | Broeksteeg et al. | |
| 2003/0135382 A1 | 7/2003 | Marejka et al. | |
| 2004/0060044 A1* | 3/2004 | Das | G06F 11/1433 717/171 |
| 2004/0068424 A1 | 4/2004 | Lee et al. | |
| 2006/0129870 A1 | 6/2006 | Parent et al. | |
| 2006/0236056 A1 | 10/2006 | Nagata | |
| 2008/0077366 A1 | 3/2008 | Neuse et al. | |
| 2008/0097960 A1 | 4/2008 | Dias et al. | |
| 2008/0115195 A1 | 5/2008 | Malek et al. | |
| 2008/0163092 A1 | 7/2008 | Rao | |
| 2008/0247314 A1 | 10/2008 | Kim | |
| 2008/0301663 A1 | 12/2008 | Bahat et al. | |
| 2009/0018996 A1 | 1/2009 | Hunt et al. | |
| 2009/0063699 A1 | 3/2009 | Chapweske et al. | |
| 2009/0070462 A1 | 3/2009 | Saenz et al. | |
| 2010/0162406 A1 | 6/2010 | Benameur et al. | |
| 2010/0250487 A1 | 9/2010 | Gabriel et al. | |
| 2010/0318986 A1 | 12/2010 | Burke et al. | |
| 2011/0054968 A1 | 3/2011 | Galaviz | |
| 2011/0055823 A1* | 3/2011 | Nichols | H04L 67/10 717/174 |
| 2011/0145525 A1 | 6/2011 | Browne et al. | |
| 2011/0314344 A1 | 12/2011 | Okamoto et al. | |
| 2012/0096149 A1 | 4/2012 | Sunkara et al. | |
| 2012/0167094 A1 | 6/2012 | Suit | |
| 2012/0198279 A1 | 8/2012 | Schroeder | |
| 2012/0310765 A1 | 12/2012 | Masters | |
| 2013/0042123 A1 | 2/2013 | Smith et al. | |
| 2013/0197863 A1 | 8/2013 | Rayate et al. | |
| 2013/0297769 A1 | 11/2013 | Chang et al. | |
| 2013/0311740 A1 | 11/2013 | Watanabe et al. | |
| 2014/0019387 A1 | 1/2014 | Cao et al. | |
| 2014/0089505 A1 | 3/2014 | Haserodt et al. | |
| 2014/0165063 A1 | 6/2014 | Shiva et al. | |
| 2014/0282456 A1 | 9/2014 | Drost et al. | |
| 2014/0331209 A1 | 11/2014 | Singh | |
| 2014/0358944 A1 | 12/2014 | Brower, Jr. et al. | |
| 2015/0019195 A1 | 1/2015 | Davis | |
| 2015/0019197 A1 | 1/2015 | Higginson | |
| 2015/0019488 A1 | 1/2015 | Balch et al. | |
| 2015/0019706 A1 | 1/2015 | Raghunathan et al. | |
| 2015/0081574 A1 | 3/2015 | Selby et al. | |
| 2015/0089479 A1* | 3/2015 | Chen | G06F 11/3664 717/124 |
| 2015/0095892 A1 | 4/2015 | Baggett et al. | |
| 2015/0100829 A1* | 4/2015 | Nanjundappa | G06F 11/3688 714/38.1 |
| 2015/0178052 A1 | 6/2015 | Gupta et al. | |
| 2015/0220426 A1* | 8/2015 | Spektor | G06F 8/71 717/131 |
| 2015/0242636 A1 | 8/2015 | Khan et al. | |
| 2015/0295792 A1 | 10/2015 | Cropper et al. | |
| 2016/0026555 A1 | 1/2016 | Kuo et al. | |
| 2016/0072730 A1 | 3/2016 | Jurban et al. | |
| 2016/0132320 A1 | 5/2016 | Fitzgerald et al. | |
| 2016/0164738 A1 | 6/2016 | Pinski et al. | |
| 2016/0350205 A1 | 12/2016 | Acharya et al. | |
| 2016/0371170 A1 | 12/2016 | Salunke et al. | |
| 2018/0267908 A1 | 9/2018 | Pan et al. | |
| 2018/0287902 A1 | 10/2018 | Chitalia et al. | |
| 2019/0109822 A1 | 4/2019 | Clark et al. | |
| 2019/0213068 A1 | 7/2019 | Upadhyay | |
| 2019/0288956 A1 | 9/2019 | Pulier et al. | |
| 2019/0317829 A1 | 10/2019 | Brown et al. | |
| 2020/0019393 A1 | 1/2020 | Vichare et al. | |
| 2020/0099773 A1 | 3/2020 | Myers et al. | |
| 2020/0112624 A1 | 4/2020 | Smith et al. | |
| 2020/0119979 A1 | 4/2020 | Woodland et al. | |
| 2020/0204465 A1 | 6/2020 | Baker et al. | |
| 2020/0293436 A1 | 9/2020 | Carames et al. | |
| 2020/0366572 A1 | 11/2020 | Chauhan | |
| 2021/0064492 A1 | 3/2021 | Myers | |
| 2021/0065078 A1 | 3/2021 | Gardner et al. | |
| 2021/0067607 A1 | 3/2021 | Gardner et al. | |
| 2021/0073026 A1 | 3/2021 | Myers et al. | |
| 2021/0081298 A1 | 3/2021 | Gardner et al. | |
| 2021/0124610 A1 | 4/2021 | Gardner et al. | |

OTHER PUBLICATIONS

MicroStrategy, Inc., "Upgrade Guide" 2015, Version 10, 118 pages.

US Office Action in U.S. Appl. No. 16/557,482, dated Nov. 30, 2020, 13 pages.

Abbors et al., "An Automated Approach for Creating Workload Models from Server Log Data," 9th Intl Conf. on Software Engineering and Applications, 2014, 1-12.

Ancillaryinsights online], "MicroStrategy Analytics Enterprise—Upgrade Guide", 2013, retrieved on Sep. 29, 2021, retrieved from URL <http://ancillaryinsights.com/producthelp/AnalyticsEnterprise/manuals/en/UpgradeGuide.pdf>, 122 pages.

Bedford-computing [online]. "JMeter Tutorial", retrieved on Sep. 29, 2021. retrieved from URL <http://bedford-computing.co.uk/learning/wp-content/uploads/2016/03/JMeter-Tutorial.pdf>, 53 pages.

HP [online], "An Introduction to HP LoadRunner software" May 2011, retrieved on Sep. 29, 2021, retrieved from URL <https://www.hp.com/sg-en/pdf/LR_technical_WP_tem_196_1006601.pdf>, 8 pages.

Jaspersoft [online], "Performance Testing with Jmeter", 2012, retrieved on Sep. 29, 2021, retrieved from URL <https://community.jaspersoft.com/wiki/performance-testing-jmeter >, 4 pages.

Microfocus [online], "LoadRunner and Performance Center", Feb. 2018 ,retrieved on Sep. 29, 2021, retrieved from URL < https://www.microfocus.com/media/documentation/loadrunner_and_performance_center_document.pdf >, 249 pages.

MicroStrategy [online], "KB16749: What is MicroStrategy Integrity Manager?", 2019, retrieved on Sep. 29, 2021. retrieved from

(56) References Cited

OTHER PUBLICATIONS

URL <https://community.microstrategy.com/s/article/KB16749-What-is-MicroStrategy-Integrity-Manager?language=en_US >, 2 pages.

MicroStrategy [online], "Configuring an upgrade test environment", 2019, retrieved on Sep. 29, 2021, retrieved from URL < https ://doc-archives.microstrategy.com/producthelp/11.0/UpgradeGuide/WebHelp/Lang_1033/Content/configuring_an_upgrade_test_environment.htm >. 2 pages.

MicroStrategy [online], "High-level steps to configure an upgrade test environment", 2019, retrieved on Sep. 29, 2021, retrieved from URL < https://doc-archives.microstrategy.co m/producthelp/11.0/UpgradeGuide/WebHelp/Lang_1033/content/high_level_steps_to_configure_an_upgrade_test_envi.htm >, 2 pages.

MicroStrategy [online], "Integrity Manager—Upgrade Impact Testing". 2019. retrieved on Sep. 29, 2021. retrieved from URL. < https://www2.microstrategy.com/prodacthelp/2019/UpgradeGuide/en-US/Content/Integrity testing.him >, 2 pages.

MicroStrategy [online], "Integrity Manager Homepage", 2019, retrieved on Sep. 29, 2021, retrieved from URL < https://community.microstrategy.com/s/article/Integrity-Manager-Homepage?language=en_US >, 2 pages.

MicroStrategv [online]. "MicroStrategy Capacity Testing Tool", 2019, retrieved on Sep. 29, 2021, retrievedfrom URL<https://www2.microstrategy.com/producthelp/2019/UpgradeGuide/en-us/Content/capacity_testing.htm >, 2 pages.

MicroStrategy [online], "MicroStrategy Integrity Manager" 2017, retrieved on Sep. 29, 2021, retrieved from URL < https://doc-archives. microstrategy.com/producthelp/10.4/ProjectDesignGuide/WebHelp/Lang_1033/Content/ProjectDesign/MicroStrategy_Integrity_Manager.htm >, 2 pages.

MicroStrategy [online], "MicroStrategy Upgrade Best Practices" Aug. 2019, retrieved on Sep. 29, 2021. retrieved from URL. < https://community.microstrategy.com/s/article/MicroStrategy-Upgrade"Best"Practices?language=en_US >, 2 pages.

MicroStrategy [online], "Perform Basic Stability Testing", 2019, retrieved on Sep. 29, 2021, retrieved from URL < https://doc-archives.microstrategy.com/producthelp/11.0/UpgradeGuide/WebHelp/Lang_1033/Content/perform_basic_stability_testing_on_the_test_server.htm >, 2 pages.

MicroStrategy [online], "Technology Futures" 2016, retrieved on Sep. 29, 2021, 6 pages.

MicroStrategy [online], "The Upgrade Process Checklist", 2019, retrieved on Sep. 29, 2021, retrieved from URL <https://doc-archives. microstrategy.com/producthelp/11.0/UpgradeGuide/WebHelp/Lang_1033/Content/the_upgrade_process_checklist.htm >, 3 pages.

MicroStrategy [online], "Upgrade Analysis Dossier", 2020, retrieved on Sep. 29, 2021, retrieved from URL < https://community.microstrategy.com/s/article/Upgrade-Analysis-Dossier?language=en_US >, 2 pages.

MicroStrategy [online], "Upgrade Guide—Upgrading your MicroStrategy Enterprise Software", 2016, retrieved on Sep. 29, 2021, retrieved from URL < https://doc-archives.microstrategy.com/producthelp/10.4/manuals/en/UpgradeGuide.pdf>, 109 pages.

Pederson, "Testing SharePoint Apps in Production (Canary Release)", Simon J.K. Pedersen's Azure & Docker blog, 2014, 1-9.

Tutorialspoint [online], "JMETER—Quick Guide", 2007, retrieved on Sep. 29, 2021, retrieved from URL <https://www.tutorialspoint.com/jmeter/pdf/jmeter_quick_guide.pdf >, 49 pages.

U.S. Office Action in U.S. Appl. No. 17/024,050, dated Sep. 7, 2021, 27 pages.

U.S. Office Action in U.S. Appl. No. 17/024,050, dated Aug. 19, 2021, 13 pages.

GWS Advisor [online], "What's New in Microstrategy 2019", Jan. 2019, retrieved on Oct. 8, 2021, retrieved from URL < https://www.gwsadvisory.com/wp-content/uploads/2019/01/whats-new-in-microstrategy-2019.pdf>, 138 pages.

MicroStrategy [online], "MicroStrategy 10.9 Readme", 2017, retrieved on Oct. 5, 2021, 124 pages.

MicroStrategy [online], "System Administration Guide". 2018. retrieved on Oct. 5, 2021, 831 pages.

MicroStrategy [online], "Tools to Upgrade with Confidence", Feb. 4, 2019, retrieved on Oct. 12, 2021, 26 pages.

MicroStrategy [online], "Upgrade Guide—Upgrading vour MicroStrategy Enterprise Software", Jun. 2016, retrieved on Oct. 8, 2021, retrieved from URL <https://doc-archives.microstrategy.com/producthelp/10.4/manuals/en/UpgradeGuide.pdf >, 109 pages.

MicroStrategy [online], "Upgrade Guide—Version 10", 2015, retrieved on Oct. 8, 2021, retrieved from URL. <https://doc-archives.microsrategy.com/producthelp/10/manuals/en/UpgradeGuide.pdf>, 118 pages.

MicroStrategy [online], "Upgrade Guide—Version 10. 9", Sep. 2017, retrieved on Oct. 8, 2021, retrieved from URL <htpps://www2.microstrategy.com/producthelp/10.9/manuals/en/UpgradeGuide.pdf>, 90 pages.

MicroStrategy [online], "Upgrade Guide—Version 10,11", Jun. 2018, retrieved on Oct. 8, 2021, retrieved from URL < https://www2.microstrategy.com/producthelp/10.11/manuals/en/UpgradeGuide.pdf >, 92 pages.

* cited by examiner

VALIDATING SOFTWARE FUNCTIONALITY

CROSS-REFERENCE TO RELATED APPLICATION

This application claims the benefit of U.S. Provisional Patent Application No. 62/803,882, filed on Feb. 11, 2019, the entirety of which is incorporated by reference herein.

BACKGROUND

The present specification relates to validating software functionality, including validating actual or potential workflows for using enterprise software.

Enterprise software is increasingly complex. The complexity is also increased by the unique needs and customization of different organizations. Testing of software installations is an important step to allow servers and other systems to operate correctly and reliably, but effective testing can be challenging due to the different scenarios in which different organization may use a software product.

SUMMARY

In some implementations, a testing system generates computing environments that simulate the unique characteristics of specific software installations of different organizations. The computing environments may be implemented using cloud-computing virtual machines, allowing multiple copies to be created quickly and remotely. The computing environments can then be upgraded to different software versions, and the upgraded software can be tested with simulations based on the organization's own data and usage patterns. For example, typical actions performed using the original software installation can be simulated using the upgraded, cloud-based environments to verify that upgrading would be seamless for the most important or most common uses of the system. If any aspects of the upgraded software that are not compatible with the data and configuration from the original installation, the testing system can identify the incompatibilities so they can be resolved. Other aspects of testing can also be performed using the computing environments. For example, tests of an environment with a software upgrade can apply new functionality from the upgrade to existing customer data, to ensure compatibility and perform operations that could not be tested on the original installation before upgrading.

The testing system may provide a user interface so that users can initiate the creation and testing of computing environments. As an example, the user interface may be provided to a software developer, who may test computing environments representing different customer installations to develop software to be distributed. As another example, the user interface may be provided to an administrator for a specific organization, who may test the environments to verify compatibility in preparation for an upgrade.

In general, each installation of a software product may have unique characteristics. For example, standard software is often customized with user data, customized configuration settings, automated scripts, privilege restriction settings, service level agreements, and so on, which makes each installation unique. These customizations add a level of complexity that a software developer often cannot anticipate or test.

Using customer data and information about actual customer installations of software can improve the effectiveness of testing. For example, cloud computing environments that replicate at least portions of customer software installations can be used to simulate the upgrade process itself and identify any incompatibilities. In addition, after an upgrade is performed, testing can be performed in a comprehensive manner, using customer-specific or installation-specific tests. For example, the most frequently used data objects or sequences of operations can be recreated, along with other more general testing. Several types of testing may be performed, including integrity testing, functional regression testing, performance load testing (e.g., evaluating capacity, throughput, etc.), and stability or stress testing. Using virtual machines on a cloud computing platform can also enable a greater volume of tests to be performed, with multiple versions being tested in parallel, and with cloud-computing virtual machines representing the settings of different original installations. This type of testing increases the likelihood of achieving a seamless upgrade or migration of software installations.

In some implementations, a system can be configured to test different versions of an enterprise application based on data from a first installation of the application. The received data may include the configuration information for the customer's server environment, as well as metadata, data sets, usage logs, and other information about the first installation. Based on the received data, the system may create one or more virtual computing environments, which may be hosted by a third-party cloud computing provider. The new computing environments can have custom configuration information from the first installation deployed to them, so that the computing environments replicate, at least in part, the dependencies and other relationships present in the first installation. Part of the testing process can involve upgrading or otherwise altering the new installations using an installer for a different version of the enterprise application.

Data about the first installation is analyzed and used to automatically design tests for the upgraded versions of the application. Various tests may be performed, such as data integrity testing, functional regression testing, capacity and performance testing, and dynamic stress testing. Results of the tests can be analyzed to identify problematic software modules, configuration settings, and/or customer data. These results can be used to annotate the development codebase of the enterprise application, to create a version of the enterprise application with greater compatibility.

In one aspect, a method includes obtaining data indicating a configuration of a first server environment running a third-party installation of a first version of an application; generating a second server environment configured to run the first version of the application, the second server environment having a set of configuration settings determined from configuration settings of the first server environment indicated by the data for the first server environment; running an installer for a second version of the application to transition the second server environment to the second version of the application; and after running the installer to update the second server environment to the second version of the application, evaluating capabilities of the second version of the application using a series of tests for application on the second server environment, where the tests evaluate at least one of (i) integrity of relationships within the data, (ii) performance characteristics of the second server environment, or (iii) progressions of randomly or pseudo-randomly selected features of the application using the data.

In some implementations, the series of tests includes a test that evaluates integrity of relationships within the data. Evaluating includes identifying a set of data objects referenced in the data; identifying, for each of the identified data objects, a set of operations performable for the data object; initiating, for each of the identified data objects, performance of each operation in the set of operations; and determining, for each of the identified data objects, which operations completed successfully.

In some implementations, the series of tests includes a test that evaluates performance characteristics of the second server environment by evaluating at least one of speed, capacity, reliability, or resource utilization of the second server environment.

In some implementations, the performance characteristics include at least one of response time, task completion time, capacity to support current users, processor utilization, memory utilization, or communication bandwidth utilization.

In some implementations, the series of tests evaluate results of operations that usage log data for the first server environment indicates were previously performed using the first server environment.

In some implementations, the series of tests evaluate results of operations that are not available to be performed using the first version of the application.

In some implementations, the series of tests involve progressions of randomly or pseudo-randomly selected features of the application using the data.

In some implementations, evaluating capabilities of the second version of the application includes continuing to initiate operations selected in a randomly or pseudo-randomly selected manner to cause the second version of the application to crash.

In some implementations, the second server environment is hosted by a remote server system.

In some implementations, the method further includes evaluating the results from the series of tests; and based on the evaluation, identifying software modules within the second version of the application that were affected by errors.

In some implementations, the method further includes evaluating the results from the series of tests; and based on the evaluation, annotating the development codebase for the second version of the application.

In some implementations, the method further includes evaluating the results from the series of tests; and based on the evaluation, identifying, removing, or correcting one or more portions of the data associated with an error.

Other embodiments of these and other aspects disclosed in the application include methods, systems, apparatus, and computer-readable media storing software instructions, each configured to perform the functions disclosed herein.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
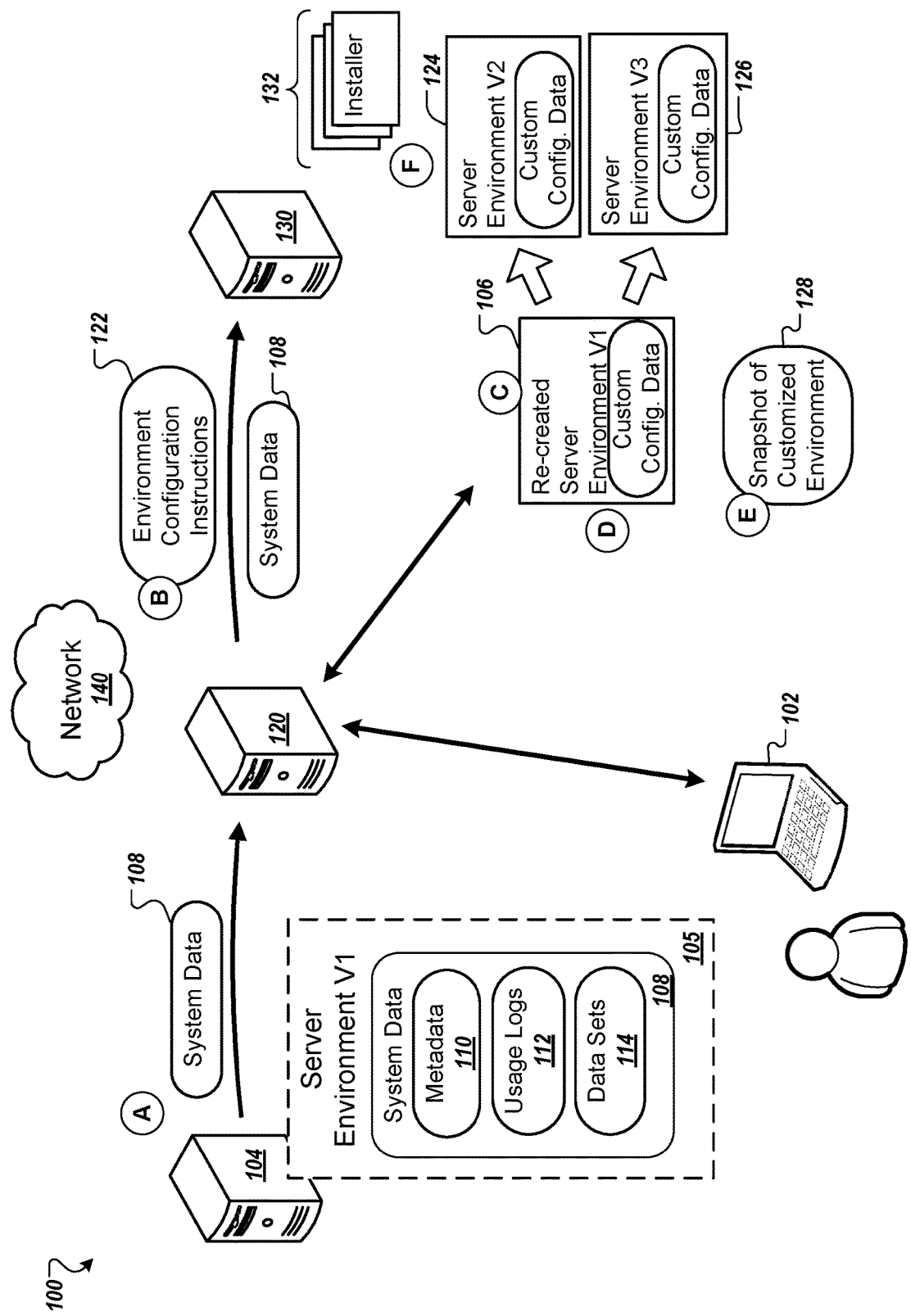
FIGS. 1A-1B are diagrams that illustrate an example system for testing computing environments.
Figure 1B:
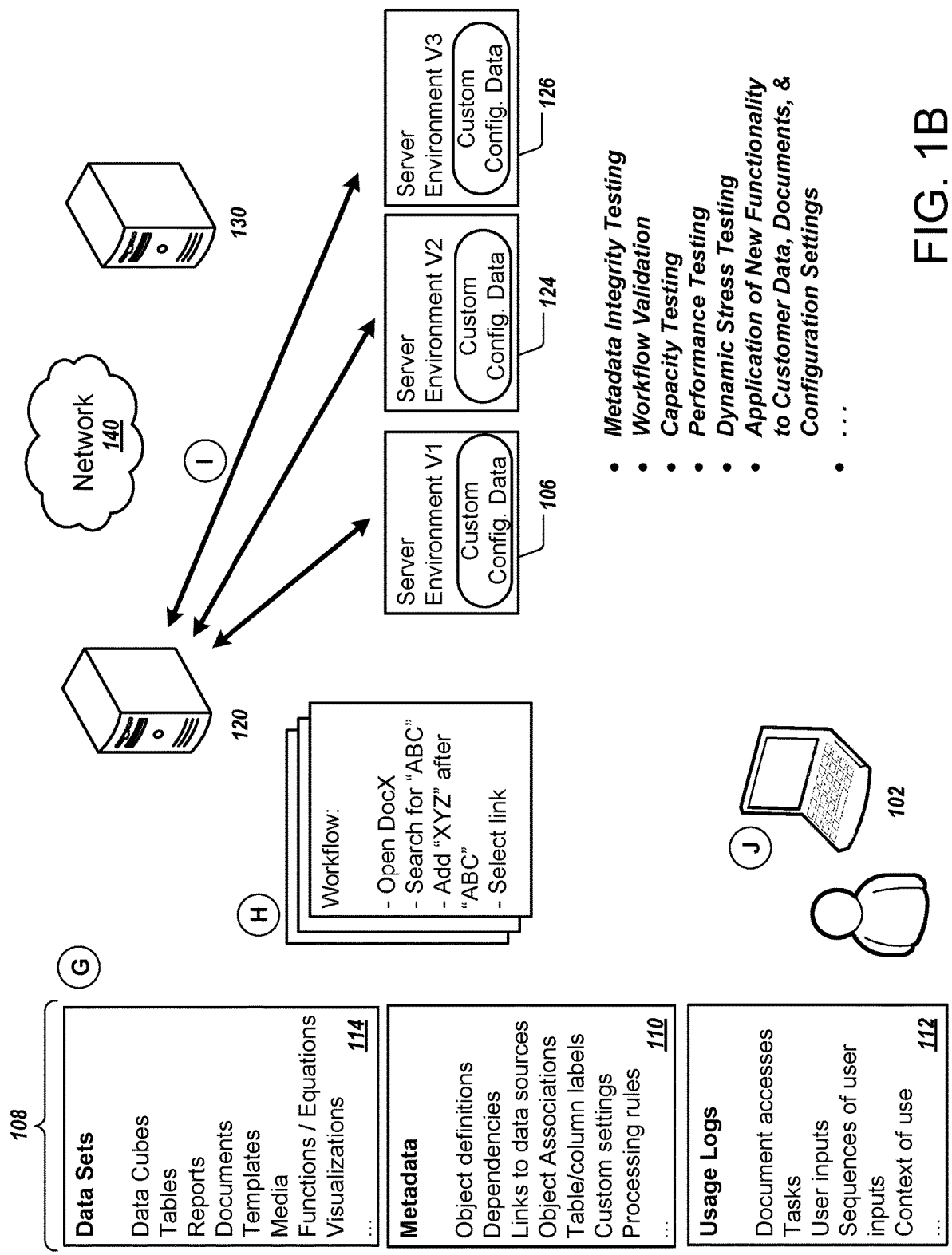

FIGS. 1A-1B are diagrams that illustrate an example system 100 for testing computing environments. The testing may include obtaining data from an existing computing environment of a third party, such as a customer. The testing may also include creating one or more computing environments based on the data from the customer's existing computing environment. For example, the computing environments can be virtual machines, created using a cloud-computing platform, that replicate portions of a customer's original computing environment. The computing environments can be used to test different versions of an enterprise application (e.g., different build versions or different configurations) and determine how well different versions can operate with the customer's unique set of data and customizations.

As part of the testing, the system 100 can define workflows (e.g., sequences of operations using the application) based on the customer's data. These workflows can be tested by attempting to run the operations of the workflows in the newly created computing environments, in order to ensure that upgraded software will function properly for that customer. Software developers can use the system 100 to test different build versions of an enterprise application on a variety of computing environments that are based on the data and usage of particular customers. This process can provide much more complete and effective testing than other method. Because the tests can be based on real-world data sets and configurations providing complex scenarios, testing can reveal errors and incompatibility that manually generated tests could not.

The system 100 includes a client device 102, a computing system 104, a testing system 120, a cloud computing provider 130, and a network 140. FIGS. 1A-1B also illustrate a series of actions, shown as stages (A) to (I), that can be performed to set up and carry out testing. Stages (A) to (I) may occur in the illustrated sequence, or in a sequence that is different from the illustrated sequence. For example, some of the stages may occur concurrently.

The client device 102 can be a computing device, such as, for example, a desktop computer or laptop computer. The client device 102 communicates with the testing system 120 over the network 140. With the client device 102, an administrator can specify what to test and how tests should be run. For example, the administrator can initiate the creation of cloud-based computing environments, select versions of an enterprise application to test, create workflows for testing, and specify other aspects of testing.

The testing system 120 manages the creation and execution of tests. The testing system 120 can include one or more computers, such as a server.

The computing system 104 can include one or more computers, such as, for example, one or more computers of a server system. The computing system 104 may be a customer's locally managed server system (e.g., a datacenter or on-premises server) or may represent computing hardware providing a cloud computing environment. The computing system 104 provides a server environment 105 (i.e., Server Environment V1) that includes an installation of an enterprise application. This installation of the application is illustrated as system data 108, which may include metadata 110, usage logs 112, and data sets 114 pertaining to the customer's installation of the enterprise application. The computing system 104 communicates with the testing system 120 over a network 140.

The cloud computing provider 130 represents computing infrastructure that can be accessed using an application programming interface (API) to generate and manage instances of cloud-based server environments (e.g., virtual machines). The cloud computing provider 130 may be separate and independent from the testing system 120 and may be operated by a third party. The cloud computing provider 130 communicates with the testing system 120 over network 140.

The results of the testing performed by the testing system 120 can indicate whether a version of the enterprise application and/or new features found in a version of the enterprise application will function properly for a particular customer. Similarly, the testing results can indicate which server environments performed best, which were the most efficient, and/or which, if any, performed unsatisfactorily.

In general, enterprise applications refer to types of computer software used to fulfill business needs of organizations such as businesses, schools, interest-based user groups, governments, and the like. Often, these applications rely on large databases and serve data to tens, hundreds, or thousands of users in an organization. The enterprise applications can be configured and operated on client devices using a variety types of server environments.

A server environment generally refers to the server portion of a client-server application framework that can be used to exchange application content, data, and/or other information that is necessary to provide and support enterprise applications. In some cases, a server environment can be provided by servers that are owned or managed by the organization that they serve. For example, these may be "on-premises" servers which may be co-located within a particular location associated with an organization. As another example, server environments may be provided by a remote datacenter that a customer operates. As another example, a server environment can be a cloud-based environment provided by servers that are managed and maintained by a third party at a location that may be distant from the organization. In some implementations, as described more particularly below, multiple different server environments can be used within a system to exchange data from a set of distributed data sources.

Testing using the data from a variety of actual installations of an application can provide more effective and more efficient testing than manually designed tests. For example, a software developer may not be able to anticipate the errors may arise from the custom functions, equations, or sequences of operation in a customer's data, from the type of data found in the customer's data, and/or from the volume of the customer's data. Therefore, there may be aspects of a customer's data that a developer could not anticipate and, thus, not accounted for otherwise. Without data to target to the usage of actual installations, there would be too many permutations of how a customer could use an enterprise application to efficiently test.

The techniques disclosed in this document can reduce the number of errors that customers experience with an enterprise application by increasing the effectiveness of enterprise application testing. As will be discussed in more detail below, enterprise application testing is made more effective by obtaining and analyzing customer data. Customer data can provide the developer with software uses that they may not have anticipated. In addition, customer data can be used to limit the scope of permutations of how a customer could use an enterprise application to just those permutations that are possible for a particular customer. Based on the customer data, the disclosed system can test the customer data for integrity, can use the customer data while testing for capacity or performance, and can determine all of the possible ways in which the customer could use the enterprise application and test each possible use and/or series of uses (e.g., workflows). The results of these tests can be used to validate the functionality of a tested build version of an enterprise application, or can be used to create one or more new build versions of the enterprise application free of errors. A build version of the enterprise application free of errors may then be provided to the customer whose data was used during the testing process.

The techniques disclosed in this document can further improve over previous test systems by allowing testing of a variety of build versions of an enterprise application, including development build versions. The disclosed system automatically replicates a customer's implementation of the enterprise application. As will be discussed in more detail below, this involves obtaining a customer's data and configuration information in order to make a snapshot of the customer's environment. With this snapshot, the disclosed system can update the environment to any build version, earlier or later. This further improves over previous test systems by allowing the testing to be carried out as the build version of the enterprise application is developed, and, thus, does not require that the build version be a production version of the enterprise application.

The techniques disclosed in this document can further improve over previous test systems by allowing for functionality testing of new features within different build versions of an enterprise application. The disclosed system does not simply re-create a customer's previous usage of the enterprise application but creates new uses (e.g., workflows) based on customer data to be tested and allows for the testing of various build versions of the enterprise application, including the testing of any new features found within these build versions. Therefore, the disclosed system can test new functions that a customer could not have performed on their own due to their installed build version of the enterprise application failing to have these new features. The disclosed system can effectively test how these new features would interact with a customer's data and existing server environment. For example, if a customer's data indicates that the customer creates a report with 2000 metrics to be calculated, and if a new email feature has been added to a build version of the enterprise application, then the disclosed system will test if the new email feature is able to handle a report with 2000 metrics.

The techniques disclosed in this document can further improve over previous testing systems by providing increased flexibility and reducing testing time. The disclosed system can carry out testing of the one or more build versions of an enterprise application on a cloud computing environment. This provides increased flexibility by allowing the creation of numerous server environments on which the one or more build versions of an enterprise application can be tested. Implementing a cloud computing environment can also reduce testing time by allowing testing on the numerous server environments to be carried out concurrently. The disclosed system may also reduce testing time in other ways, such as, for example, automatically determining the configurations of the server environments to be created.

As shown in FIG. 1A, at stage (A), the testing system requests data from a computing device 104. The computing system 104 receives the request and sends system data 108

(e.g., information about the particular installation of software) to testing system 120 over network 140. This process can be initiated by an administrator through the client device 102. An administrator may initiate the testing process by, for example, selecting a particular customer from a list of customers for a request to be sent to. In other implementations, the process is initiated by a customer through the computing system 104.

As an example, an administrator may select a particular customer installation of an application, which may provide an environment for build version 9.2 of an application. The administrator may choose a different build version to be tested, such as version 11.1. Through the remaining operations discussed below, the testing system 120 can create a new cloud-based server environment that includes data from the original customer installation, but is upgraded to build version 11.1 of the application. The upgraded version 11.1, running on a cloud-based virtual machine, can be tested with operations that make use of the unique aspects (e.g., dependencies, configuration settings, etc.) of the original environment running version 9.2.

The system data 108 (e.g., customer data) may include metadata 110, usage logs 112, and data sets 114 associated with the server environment 105. In some implementations, system data 108 also includes configuration information for customer's server environment 105. In some implementations, system data 108 also indicates the build version of the enterprise application installed on the computing system 104.

In some implementations, system data 108 represents a customer's published data, in a form intended to be consumed by client devices that interact with the system but excluding underlying source information. In other implementations, system data 108 includes a customer's data warehouse, which may include unpublished data. In those implementations, the increased amount of data from a customer's data warehouse may allow for more comprehensive and effective testing. In some implementations, testing system 120 receives system data 108 as an archive file (e.g., a Zip file) and proceeds to extract its contents.

The metadata 110 can be data that describes data objects in the data sets 114. The metadata 110 may indicate a configuration of these data objects for a server environment. The metadata 110 may include, for example, object definitions, dependencies, schema, basis of reports, links to data sources, object associations, table/column labels, custom settings, processing rules, etc. In general, the metadata 110 can enumerate data objects that are part of the server environment 105 as well as describe properties of those data objects and indicate relationships among the data objects.

At stage (B), the testing system 120 provides environment configuration instructions 122 to the cloud computing provider 130 over the network 140. The environment configuration instructions 122 may include configuration information of the server environment 105, and/or information on the build version of the enterprise application installed on the computing system 104. The environment configuration instructions 122 are provided to cloud computing provider 130 so that it may create a cloud-based environment that replicates at least portions of the customer's implementation of the enterprise application.

At stage (C), the cloud provider 130 carries out the environment configuration instructions 122 to create a server environment 106. Initially, the environment 106 can be created using the same build version as the environment 105 to match the characteristics of the environment 105 as closely as possible. The testing system 120 and the cloud computing provider 130 can communicate further to configure and finalize the environment 106. In some implementations, the server environment is a virtual appliance, such as, for example, an Amazon Machine Image (AMI). A virtual appliance, such as an AMI provides the information required to a launch an instance of a virtual machine.

At stage (D), after obtaining the system data 108, the testing system 120 customizes the one or more server environments by loading them with custom configuration data derived from the system data 108. For example, the custom configuration data can deploy some or all of the system data 108 to the environment 106, as well as update other configuration settings to match or be similar to those of the original server environment 105. As a result, this process causes the environment 106 to replicate at least some of the configuration of the environment 105.

At stage (E), testing system 120 creates a snapshot 128 of the customized environment (i.e., a copy of the customized environment). Here, snapshot 128 is a copy of server environment 106 after it is loaded with system data 108. Snapshot 128 thus includes an installation of the application with the same build version as the environment 105, with configuration information from the environment 105 indicated in the system data 108. Snapshot 128 can be used to quickly create modified server environments having a variety of configurations and build versions of the enterprise application.

At stage (F), testing system 120 instructs the cloud computing provider 130 to create new server environments 124, 126 based on the server environment 106 or the snapshot 128. The environments 124, 126 can be generated according to instructions from an administrator. The client device 102 can provide a user interface to an administrator that enables the administrator to select one or more build versions of the enterprise application to be tested, make changes to the server environment configuration found in snapshot 128, and/or initiate testing. In some implementations, an administrator may also select the tests that should be performed on the selected build versions of the enterprise application. Selections may be made at the outset of the testing process, such as in stage (A), or at one or more points in time during the process.

For example, the administrator's instructions may include a selection of a build version of the enterprise application different from the build version of the enterprise application installed on the computing system 104. The administrator's instructions may include a modification to the configuration of server environment 106. This modification may include a change to the hardware capabilities of the server environment, such as a change to the amount of memory allocated (e.g., random-access memory), the number of CPUs allocated, the type of CPUs, network bandwidth, the latency, etc. Here, the instructions from an administrator indicate the creation of server environment 124 and server environment 126. In some implementations, one or more variations of snapshot 128 are created automatically by testing system 120. In some implementations, an administrator selects the build version of the enterprise application for testing, but the testing system 120 automatically varies the configuration of the resulting server environments. After instructions are received for the creation of one or more variations of snapshot 128, testing system 120 may cause the environments 124, 126 to run installers 132 for the new build versions.

FIG. 1B shows the process of testing the various server environments 106, 124, 126.

As shown in FIG. 1B, in stage (G), the testing process continues with the testing system 120 further analyzing the system data 108. This analysis of system data 108 may include analyzing the metadata 110, the data sets 114, and/or the usage logs 112. Analyzing the metadata 110 may include searching through metadata 110 and identifying any software objects within it, determining any dependencies or other associations between software objects, identifying any links to data sources, identifying any table/column labels, determining any custom settings, and/or determining any processing rules. As examples, the data sets 114 may include a variety of collections of data, such as, for example, software objects, data cubes, tables, reports, documents, templates, media, functions/equations, visualizations, etc. The metadata 110 may include, for example, object definitions, dependencies, links to data sources, object associations, table/column labels, custom settings, processing rules, etc.

The usage logs 112 may indicate a variety of actions previously performed by one or more users of the enterprise application. These performed actions may include, for example, document accesses, tasks, user inputs, sequences of user inputs, context of use. In some implementations, usage logs 112 describe previously performed workflows, e.g., sequences of operations that users have caused to be performed. In general, a workflow can include inputs, actions, and/or tasks that can be performed. As an example, a workflow may represent a sequence of user-directed actions such as retrieve a dashboard user interface, select a chart, generate metrics from data in a database, display the results, edit the document, etc.

At stage (H), testing system 120 determines what tests should be performed using the system data 108 and one or more build versions of the enterprise application. The tests may include, for example, metadata integrity testing, workflow validation, capacity testing, performance testing, dynamic stress testing, and application of new software features to customer data (e.g., system data 108). In some implementations, the testing system 120 receives input from the administrator through the client device 102 indicating which tests should be performed. In other implementations, the testing system 120 automatically chooses which tests to be performed. In other implementations, the testing system 120 is configured to perform all tests available. In these implementations, not all tests may be available. For example, if the build version of the enterprise application being tested does not have any new features, then no new features can be applied to a customer's data.

Some tests involve the creation, testing, and validation of workflows. Such workflows may be defined or extracted and implemented in the workflow validation testing, the dynamic stress testing, and/or the application of new features to customer data. In some implementations, during workflow validation testing, the system chooses the workflows to be tested based on usage logs 112. In these implementations, testing system 120 may extract workflows from usage logs 112 that represent specific sequences of tasks, or those that simulate typical usage. In other implementations, during workflow validation testing, the administrator may choose the workflows to be tested through client device 102. In yet other implementations, during workflow validation testing, workflows are chosen based on a combination of usage logs 112 and administrator input. The testing system 120 may also determine the most common objects and functions used within data sets 114.

Some tests, such as capacity testing and/or performance testing, involve the varying of threads during testing. In some implementations, the number of threads is varied automatically by testing system 120. In these implementations, the capacity and/or performance testing may be performed with a first number of threads. The number of threads may then be increased or decreased, and the capacity and performance testing repeated. This process may be repeated until all possible thread counts are tested or until an error, such as a system crash, occurs. In other implementations, an administrator chooses a specific number of threads or a range of threads to be tested through the client device 102.

Some tests, such as capacity testing and/or performance testing, involve increasing or decreasing the load on the server system/server environments (e.g., the number of requests per second). In some implementations, the amount of load is varied automatically by the testing system 120. In these implementations, the load may be continuously increased, for example, until an error, such as a server crash, occurs. In other implementations, an administrator chooses a specific load or a range loads through the client device 102.

At stage (I), the testing system 120 initiates the testing of the selected build versions of the enterprise application on server environments 106, 124, and 126 with the system data 108. Testing system 120 may initiate the testing over network 140. For example, the testing system 120 can issue requests to the environments 106, 124, 126 at different levels to simulate levels of load by client devices. Server environments 106, 124, and 126 may be managed/hosted by cloud computing provider 130. Testing system 120 may communicate with the server environments during testing over network 140. Testing system 120 may identify and log any errors that occurred during testing. Since the server environments 106, 124, and 126 are all hosted separately from the customer's actual environment 105, the testing is independent of and has no impact on the customer's environment 105.

At stage (J), the testing system 120 assesses the results of the tests.

Assessing the test results may involve identifying which objects, functions, and/or workflows/sequences of operations worked as needed and which did not. These results can be provided to the client device 102 and can be used to identify software modules, within the tested build version of the enterprise application, were affected by errors, to annotate the development codebase for the tested build version of the enterprise application (which can later be used to create a new build version), to identify tested server environment configurations, or parts thereof, that may have led to an error.

Figure 2:
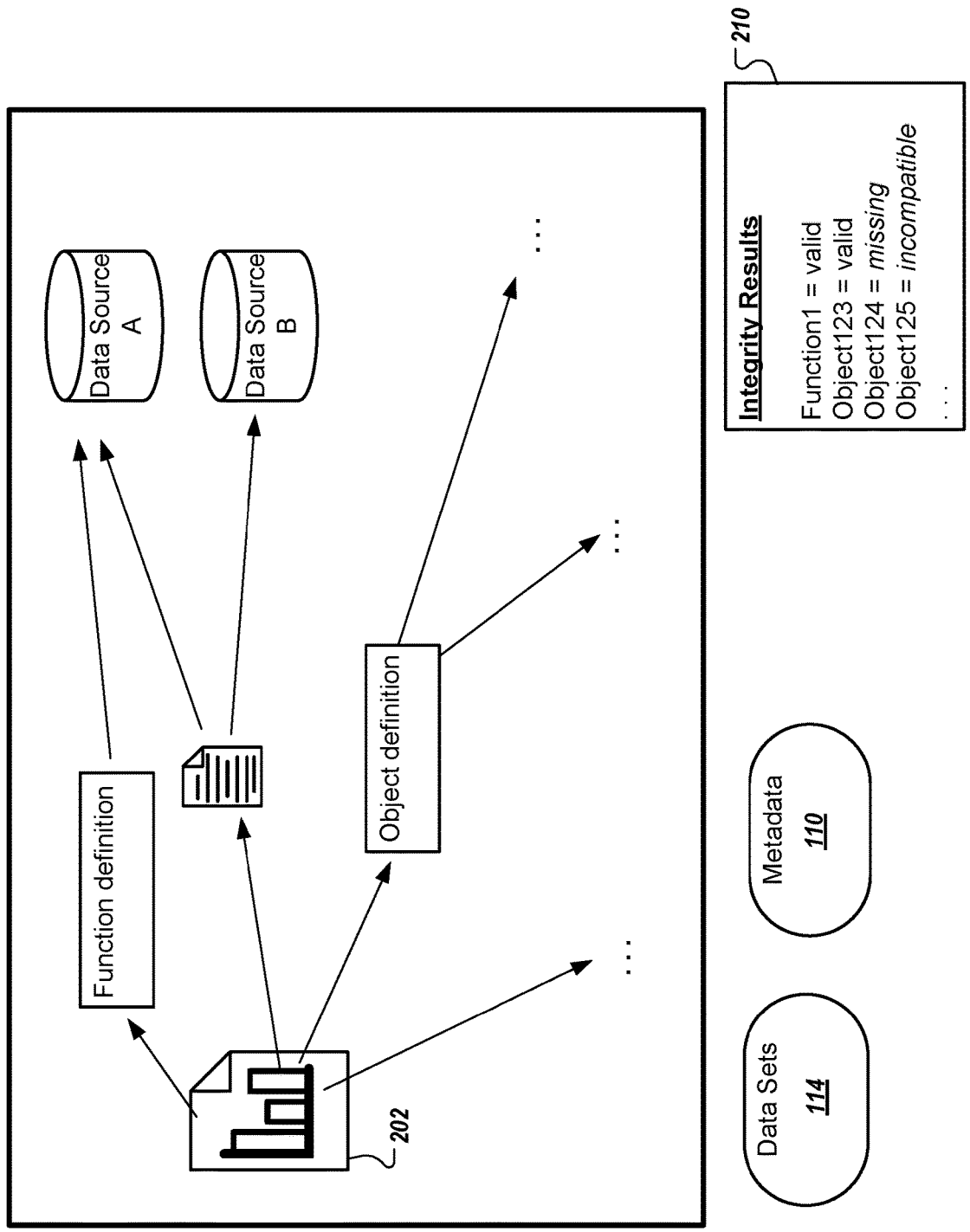
FIG. 2 is a diagram that illustrates an example of data integrity testing.

FIG. 2 is a diagram that illustrates an example of integrity testing. The testing system 120 (as shown in FIGS. 1A-1B) may perform this integrity testing. During integrity testing, the testing system 120 systematically accesses elements in the data sets 114 and verifies whether the elements are present and accessible. The testing system 120 may check all of the properties of an object, as well as attempt to perform any functions that the object allows. In a similar manner, the testing system 120 can verify that links, dependencies, requirements, and relationships are valid. In some implementations, this integrity testing is comprehensive, testing all objects or data of certain types, or even attempting to test all data elements in the data sets 114.

For a particular data item in the data sets 114 (e.g., an object or function), the testing system 120 identifies all elements in the metadata 110 that are associated with the particular data item. Here, the data item tested is a document 202. The testing system 120 traces through the dependencies for the document 202, e.g., all elements that the metadata 110 indicates that the document 110 depends on directly or indirectly. The testing system 120 checks to see if the dependency connections revealed in the metadata 110 are valid. This may involve determining whether a function, an object, or a portion of an object is missing, whether the data type of an object or a portion of an object is correct, and/or whether a function, object, or a portion of an object is unavailable for some other reason.

If a function, object, or a portion of an object is determined to be missing or inoperable, the testing system 120 may indicate this in a log. For example, in the logged integrity results 210, Object 124 is determined to be "missing." If an object or a portion of an object is incompatible with the new version for some reason, the testing system 120 may indicate this also, such as shown in the logged integrity results 210 for Object 125. The results may indicate any of various results or status classifications for the element tested.

When a connection points to a function, the testing system 120 will test the validity of the functioning by running the function to determine whether the function runs without error. The testing system 120 may then log the results of the test, for example, in the logged integrity results 210, Function1 is indicated to be "valid" as a result of testing.

The testing system 120 may continue the integrity testing process by testing every object or function identified by the metadata 110. This process is repeated until the connections for all objects and functions are checked for validity.

Figure 3:
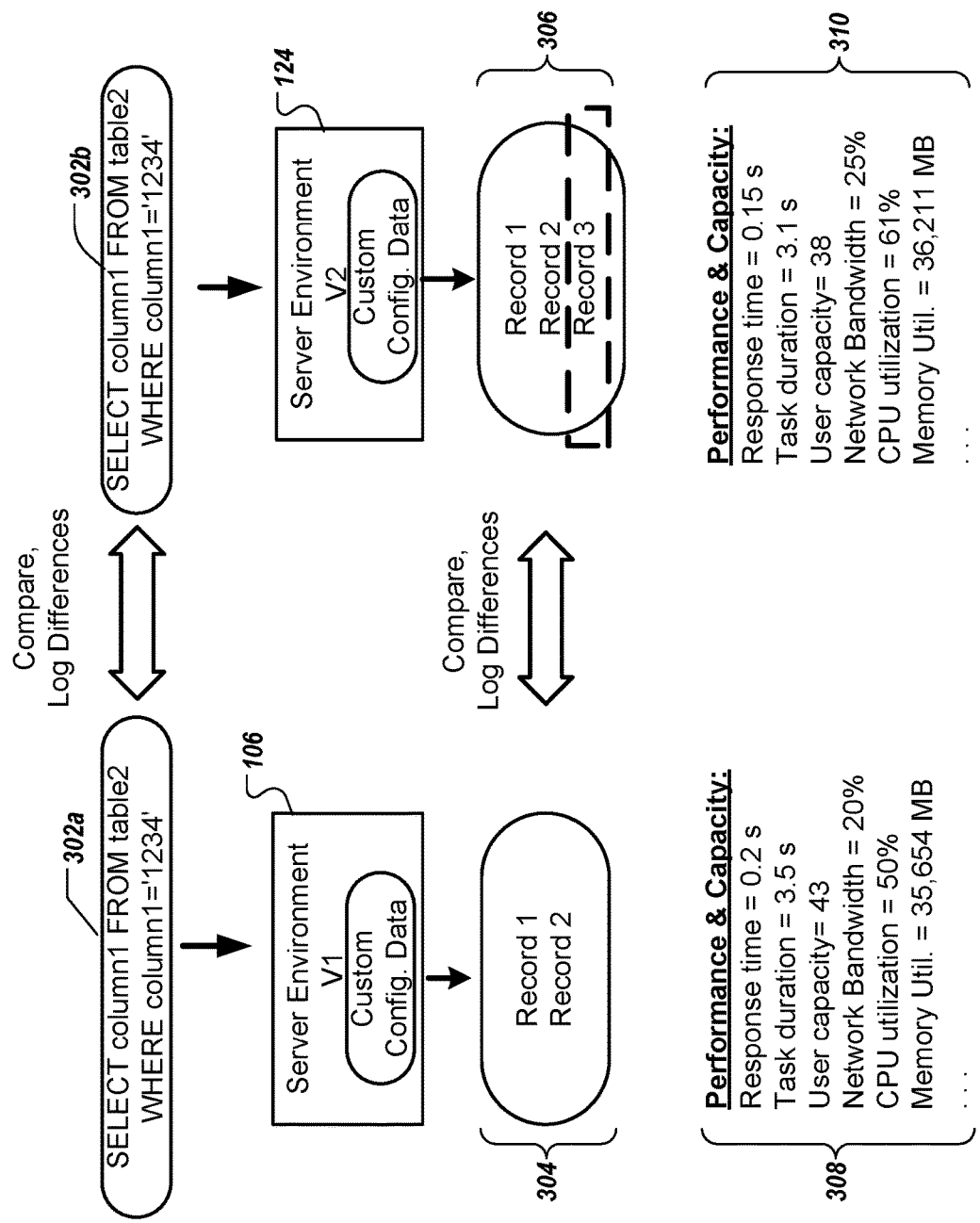
FIG. 3 is a diagram that illustrates an example of functional testing and capacity and performance testing.

FIG. 3 is a diagram that illustrates an example of testing the results of operations of different environments, as well as testing capacity and performance of the environments. The integrity testing of FIG. 2 tests whether objects and other elements of a system are present and operable, and the testing of FIG. 3 can test whether the results or output of operations of different environments are the same. In general, when comparing two versions of the same software, the same operations should yield the same results. Typically, for predictability in troubleshooting, if one version attempts a function that cannot complete and indicates an error, it is desirable that same function with the same data would indicate the same error with the new upgraded version.

The testing system 120 may cause individual operations or sequences of multiple operations to be performed on multiple server environments. Then the results of the different system can be compared.

In the example, the testing involves causing the environment 106 and the environment 124 to each generate a SQL query 302a, 302b. The testing system then compares the resulting queries 302a, 302b to determine whether the upgraded environment 124 produced the same result as the environment 106 with the original version of the application. This type of testing can be important because, in many implementations, the system data 108 includes only a subset of the information for the original environment 105, not a full copy of the entire environment 106. As a result, the testing process may not have access a customer's full data warehouse or to other data sources, and the results of an operation like a database lookup may not be feasible to carry out. Nevertheless, by checking the SQL queries generated, the system can verify that the issued commands are in fact identical or at least equivalent. This type of testing can be helpful for testing interactions with any outside systems, e.g., comparing other types of generated messages, comparing API calls, and so on.

In the example of FIG. 3, the testing system 120 does have access to sufficient data to carry out a query, and the testing system 120 executes the SQL queries 302a, 302b on both server environment 106 and server environment 124. Testing system 120 may compare the execution results from the differing server environments and log any differences in the execution results. Comparing the execution results may include, for example, comparing the number of errors that arose, comparing the type of errors that arose, determining if the same errors arose, comparing the number of data objects produced (e.g., records), comparing the type of data objects, determining if the same data objects were produced, etc. Determining that the same errors arose may indicate consistency between the server environments. Determining that more, less, or different errors arose may indicate, for example, that one server environment is improved over another, and/or can help with troubleshooting as it may indicate that a developer mistake has occurred. Similarly, determining that the same data objects were produced may indicate consistency between the server environments. Determining that more, fewer, or different data objects were produced may indicate, for example, that one server environment is improved over another, and/or can help with troubleshooting as it may indicate that a developer mistake has occurred.

As shown in FIG. 3, the execution of SQL query 302 on server environment 106 produces two data objects: "Record 1" and "Record 2." Whereas, the execution of SQL query 302 on server environment 124 produces three data objects: "Record 1", "Record 2", and "Record 3." Testing system 120 compares the results and determines that the execution of SQL query 302 on server environment 124 has produced an additional data object, "Record 3." Testing system 120 logs this difference.

Testing system 120 (as shown in FIGS. 1A-1B) may also perform capacity and performance testing. During capacity and performance testing, testing system 120 evaluates the speed, capacity, reliability, and/or resource utilization of the one or more server environments. During capacity and performance testing, testing system 120 selects a group of objects (e.g., twenty objects). In some implementations, these objects are the most critical objects. In some implementations, the customer identifies the critical objects for which performance testing is most important. In other implementations, testing system 120 automatically identifies the critical objects, for example, based on an indication of priority or usage frequency indicated by usage logs 112. In these implementations, testing system 120 may search through folders in system data 108 and identify objects for testing at certain predefined locations, such as folders labeled, for example, "root", "CXO", or "production".

Alternatively, when critical objects cannot be readily identified, testing system 120 may select objects that performed differently from one another in the data integrity testing (see FIG. 2) and form a group of objects from those selections. Two objects may be determined to perform differently from one another, for example, if one ran relatively slow or fast when compared with the execution speed of the other. Two objects may be determined to perform differently from one another, for example, if one generates a large or small amount of data when compared to the other. In addition, if there are multiple copies of an object, testing system 120 will choose the original/root object for capacity and performance testing.

Alternatively, when critical objects cannot be readily identified, testing system 120 may randomly or pseudo-randomly select data objects from system data 108.

Capacity testing and performance testing may involve varying the number of threads during testing. In some implementations, the number of threads is varied automatically by testing system 120. In these implementations, the capacity and performance testing may be performed with a first number of threads. The number of threads may then be increased or decreased, and the capacity and performance testing repeated. This process may be repeated until all possible thread counts are tested or until an error, such as a system crash, occurs. In other implementations, an administrator chooses a specific number of threads or a range of threads to be tested using the client device 102.

Capacity testing and performance testing may involve increasing or decreasing the load on the server system/server environments (e.g., the number of requests per second). In some implementations, the amount of load is varied automatically by testing system 120. In these implementations, the load may be continuously increased, for example, until an error, such as a server crash, occurs or until performance declines to a minimum threshold quality of service (e.g., average response time or completion time exceeds a maximum level). In other implementations, an administrator chooses a specific load or a range loads through the client device 102.

Once testing system 120 has selected a group of objects, it can start the capacity and performance testing on those objects within the various server environments. Capacity and performance testing may include launching the selected objects within each server environment or the selected server environments. Testing system 120 may determine and log a response time, a task duration, system reliability, a user capacity, network bandwidth, CPU utilization, and/or memory utilization during the capacity and performance testing of an object within a server environment.

In some implementations, testing system 120 evaluates results of operations that usage logs 112 indicate were previously performed using the first server environment. In these implementations, performance or capacity results from previously performing these operations on server environment 106 may have been provided to testing system 120 by the customer's computing device 104.

In the example of FIG. 3, execution of SQL requests is part of capacity and performance testing. When the SQL query 302*a*, 302*b* is carried out on server environment 106 and server environment 124, the performance is measured. Test results 308 (i.e., the results of testing SQL query 302 on server environment 106) show that there was a response time of 0.2 seconds, a task duration time of 3.5 seconds, a user capacity of 43 people, a network bandwidth of 20%, a CPU utilization of 50%, and a memory utilization of 35,654 MB. Test results 310 (i.e., the results of testing SQL query 302 on server environment 124) show that there was a response time of 0.15 seconds, a task duration time of 3.1 seconds, a user capacity of 38 people, a network bandwidth of 25%, a CPU utilization of 61%, and a memory utilization of 33,211 MB.

Testing system 120 may log these capacity and performance results. Testing system 120 may also compare the results and, in some implementations, reach conclusions. Here, testing system 120 may determine that server environment 124 performed better than server environment 106, at least in some metrics. Testing system 120 may also determine that server environment 106 has a higher capacity than server environment 124. Testing system 120 may also determine that server environment 124 requires more resources than server environment 106. Because the environment 106 represents the current version of the customer's application, the performance results for environment 106 provide a good baseline measure. Performance for the upgraded version can be accurately indicated relative to that baseline to show the potential effects of making an upgrade.

Figure 4:
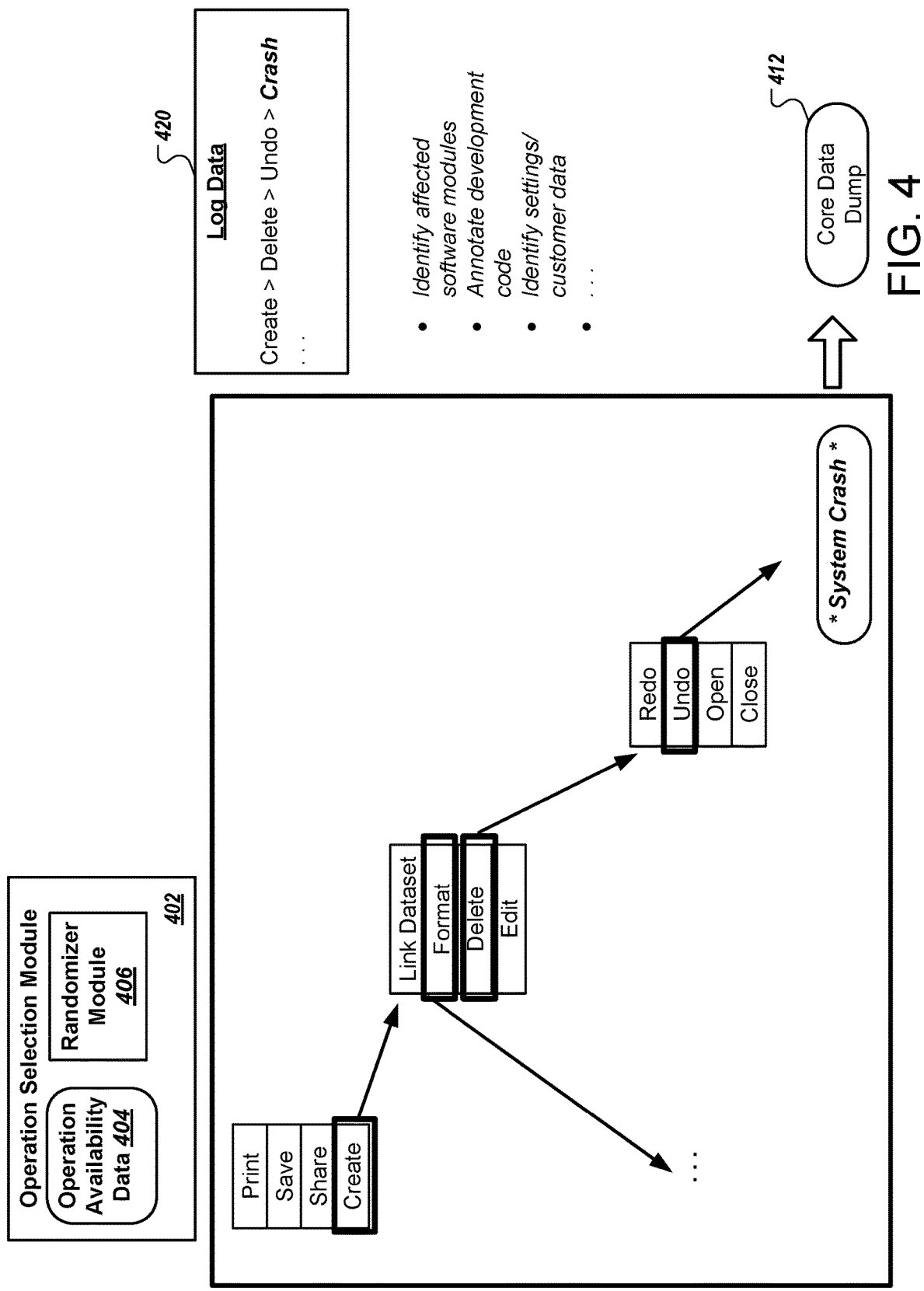
FIG. 4 is a diagram that illustrates an example of stress and feature testing.

FIG. 4 is a diagram that illustrates an example of dynamic stress and feature testing. Testing system 120 (as shown in FIGS. 1A-1B) may perform this dynamic stress and feature testing. Testing system 120 may include an operation selection module 402. Operation selection module 402 may include operation availability data 404 and a randomizer module 406.

During dynamic stress and feature testing, all potential workflows based on the functionality of the build version of the enterprise application tested and system data 108 (as shown in FIGS. 1A-1B) are randomly created and tested. The testing continues until an unexpected error, such as a system crash occurs. The dynamic stress and feature testing may be repeated a number of times. The dynamic stress and feature testing may be repeated until all (or all possible) functionality of the build version of the enterprise application has been tested with system data 108.

Operation availability data 404 may contain information regarding a set of operations that can be performed by the build version of the enterprise application tested. In some implementations, the operations that can be performed are limited by system data 108. In these implementations, the operations that can be performed may be further limited by randomizer module 406 selecting one or more data objects of system data 108, such operations that can be performed are those that are performable on the selected one or more data objects. These limitations may be accounted for in the operation availability data 404. For example, operation availability data 404 may contain information regarding only those operations that can be performed at that time/step. In some implementations, the operations that can be performed are limited by the operation that has been initially or previously performed. These limitations again may be accounted for in the operation availability data 404.

Randomizer module 406 randomly chooses one or more data objects of system data 108 and or more operations of the available operations, as found in the operation availability data 404, to be performed on the selected objects. In some implementations, randomizer module 406 only selects a single operation to be performed at a time/step, resulting in sequential workflows being performed. In other implementations, randomizer module 406 selects one or more operations to be performed at a time/step, potentially resulting in one or more parallel paths.

Testing system 120 may initiate the dynamic stress and feature testing by calling the operation selection module 402. The operation selection module 402 proceeds to call the randomizer module 406, which selects one or more objects from system data 108 and chooses, based on the operation availability data 404, an operation to perform. As shown in an example user interface 410, this initial function is a command to "Create." Here, operation availability data 404 initially is populated with the operations: "Print", "Save", "Share", or "Create." These operations are the operations that are performable on the selected one or more objects. Randomizer module 406 has selected, from the available operations, the command to "Create." The create command is then performed on the selected one or more objects from system data 108.

After the first function as been performed with system data 108, operation availability data 404 is populated with the operations: "Link Dataset", "Format", "Delete", and "Edit." These operations may be based on the selected one or more objects and/or the create command being previously selected and performed. Here, randomizer module 406 selects both the command to "Format" and the command to "Delete." Both operations are then performed on the selected one or more objects from system data 108 and a parallel path is formed. Following the delete command path, operation availability data 404 is populated with the operations: "Redo", "Undo", "Open", and "Close." Here, randomizer module 406 selects the command to "Undo." When testing system 120 attempts to perform this function on the selected one or more objects of system data 108, a system crash occurs.

When an unexpected error, such as a system crash occurs, the testing system 120 generates a core data dump 412. Core data dump 412 can include a log 420. Log 420 may contain information on the one or more objects that were selected by randomizer module 406 for the particular workflow, the one or more operations that were performed on the selected objects, the order in which the one or more operations were performed, and information on the unexpected error that occurred (e.g., system crash). Testing system 120 may send the core data dump 412—and, thus, log 420—to the client device 102 (as shown in FIGS. 1A-1B) to be analyzed.

Analysis of the core data dump 412 may result in identifying software modules, within the tested build version of the enterprise application, affected by the unexpected error. Analysis of the core data dump 412 may result in the annotation of development code for the tested build version of the enterprise application (which can later be used to create a new build version). Analysis of the core data dump 412 may result in identifying tested server environment configurations, or parts thereof, that may have led to the unexpected error. Analysis of the core data dump 412 may results in identifying, removing, or correcting customer data that may have caused the unexpected error.

Although an example user interface 410 is shown to depict the randomized workflows and user interface elements are shown to depict the options/functions chosen, such interface aspects are not required. Alternatively, various types of messages could be sent over an API. Alternatively, this testing may also be performed by having different sequences of operations requested of a database server. These alternatives need not have any user interface aspect.

Figure 5:
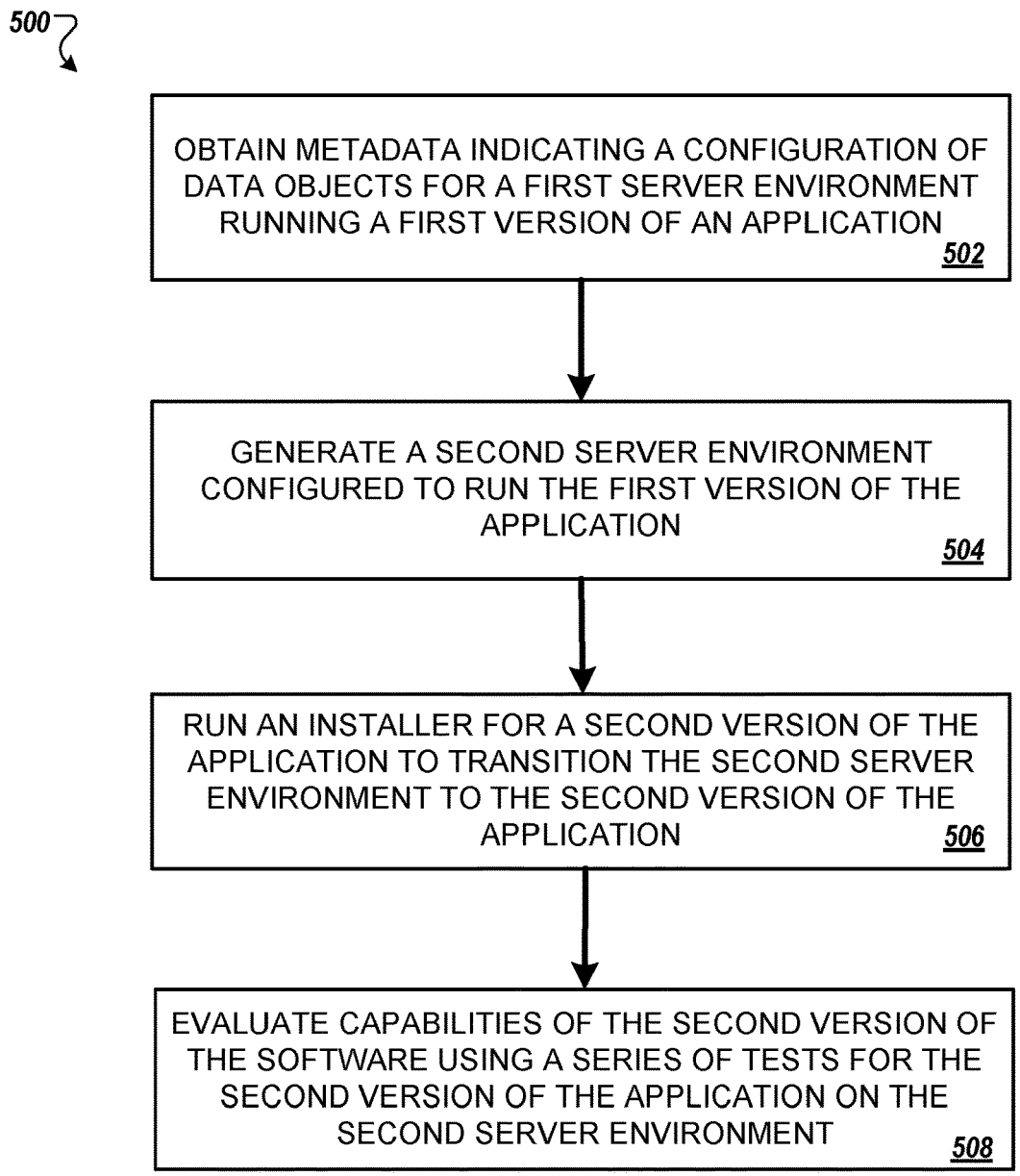
FIG. 5 is a flow chart that illustrates an example of a process for testing computing environments.

FIG. 5 is an example process 500 for testing a build version of an application on one or more server environments with a customer's data. The process 500 can be performed by one or more computers, for example, the testing system 120 of FIG. 1. The process 500 can be performed by one or more servers, client devices, or a combination thereof.

In the process 500, a computer system obtains metadata indicating a configuration of data objects for a first server environment running a first version of an application (step 502). Metadata may include, for example, object definitions, dependencies, links to data sources, object associations, table/column labels, custom settings, processing rules, etc. Data objects may include data sets, such as data cubes, tables, reports, documents, templates, media, functions/equations, visualizations, etc. A first version of the application may be a particular build version or release version of the application. The application may be an enterprise application.

The computer system generates a second server environment configured to run the first version of the application (step 504). The second server environment can be configured to use a set of configuration settings for the first server environment (e.g., the same as those of the first server environment) that are indicated by the data for the first server environment. For example, the second server environment may have a configuration that is set to match some or all of the configuration settings indicated by the metadata for the first server environment. Thus the computer system can derive settings for the second server environment from the settings of the first server environment. This can enable the second server environment to replicate or simulate the conditions present at the first server environment for validation testing. The second server environment can be hosted by a remote server system, for example, a third-party cloud computing system.

The computer system runs an installer for a second version of the application to transition the second server environment to the second version of the application (step 506). In some implementations, the installer to run is chosen by a user of the computer system. In other implementations, the computer system automatically selects the installer to run. Running the installer can simulate the process that an administrator would use to update the first version of the application. The installer may make various changes to the application, such as to change configuration settings, add files or software modules, alter files or software modules, delete files or software modules, change user interface appearance and options, etc.

After the second server environment is updated with the second version of the application, the computer system evaluates capabilities of the second version of the software using a series of tests for application on the second server environment (step 508). These tests may evaluate at least one of (i) integrity of relationships among the data objects, (ii) performance characteristics of the second server environment, or (iii) progressions of randomly or pseudo-randomly selected features of the application using the data objects indicated by the metadata.

The tests can simulate actions of a client device to send instructions and user input data to the second server environment. For example, in a fully automated manner, the computer system can initiate interactions or generate commands that match those that would be sent if a user interacted with a user interface, such as by typing text, clicking a button, etc. The computer system may use an API to send commands that represent simulated user inputs to a user interface. Similarly, with data from the developer of the application or by analyzing communication patterns for the application, the computer system can generate messages purporting to result from user interactions that match the format that the application would use, even if no user interface is provided or loaded. Of course, the computer system may optionally load or render user interfaces and use scripts to instruct an operating system or browser to actually interact with the applications as well. Even if the user interfaces are not visibly displayed (e.g., run in a "headless" configuration of a browser), the loading and actual interaction with user interface functionality can provide comprehensive end-to-end testing.

In some implementations, the series of tests includes a test that evaluates integrity of relationships within data corresponding to the first server environment. This can include: identifying a set of data objects referenced in the data; identifying, for each of one or more of the identified data objects, a set of operations performable for the data object; initiating, for each of one or more of the identified data objects, performance of each operation in the set of operations; and determining, for each of the identified data objects, which operations completed successfully.

The series of test can include performance tests for the second server environment. In general, performance characteristics can include at least one of response time, throughput, utilization, availability, bandwidth, transmission time, response time, latency, efficiency, scalability, or power consumption. For example, the series of tests can include a test that evaluates performance characteristics of the second server environment by evaluating at least one of speed, capacity, reliability, or resource utilization of the second server environment. The performance characteristics can include at least one of response time, task completion time, capacity to support current users, processor utilization, memory utilization, or communication bandwidth utilization.

The series of tests can evaluate results of operations that usage log data for the first server environment indicates were previously performed using the first server environment. For example, the computer system can determine the types of operations initiated for different data objects or types of data objects, and can generate tests to simulate or re-create those operations using the second server environment. As a result, the computer system can test the operations that have been performed and are likely to be performed in the future.

The series of tests evaluate results of operations that are not available to be performed using the first version of the application. For example, the second version of the application may provide features that are not present in the first version of the application. The tests can apply these new features to the data objects, in order to test the data objects in ways that users could not have previously used the data objects.

The series of tests involve progressions of operations using randomly or pseudo-randomly selected features of the application using the data. For example, a document can be opened, and from that state of the application a set of options are available to be performed by the application, e.g., apply a filter, edit content, save, share, move to a different page, close the document, etc. One or more of the available actions can be selected and initiated to move to another state of the application, where a set of actions is available. The computer system can once again randomly select one or more of the available options that the application provides, and continue traversing random or pseudorandom various paths through the different possible application states. In some implementations, multiple paths are traversed in parallel, such as for a server system where many client test processes are each initiating different combinations and sequences of application functions with the same or different data objects.

In some implementations, evaluating capabilities of the second version of the application includes continuing to initiate operations selected in a randomly or pseudo-randomly selected manner to cause the second version of the application to crash. The operations and responses of the second version of the application can be logged or otherwise tracked, and the logs can be analyzed by the computer system to identify operations, data objects, and conditions that led to a crash or error.

Once the results of the tests are obtained, the computer system can evaluate the results. Based on the results, the computer system may take any of a variety of actions. The computer system may provide an interface that selectively includes a control to initiate a change to the second version. For example, the computer system can send user interface data that provides a control to begin an upgrade only if the test results are determined to have fewer than a threshold number of errors, at least a minimum threshold level of performance, and/or meet other predetermined criteria. If there are serious incompatibilities, the upgrade option may not be immediately provided, or instead controls for actions to remediate the incompatibilities would be provided instead.

In some implementations, the computer system may select between different versions or configurations of the application to recommend or provide as upgrades to the first version of the application. For example, there may be multiple versions of the application, potentially with different sets of software modules, different combinations of features, and/or different configuration profiles. The computer system can use the identified errors, incompatibilities, and performance issues, as well as the information about functions or features of the software used by the data objects, to select which version or configuration of the application to recommend or install on the first software environment. For example, the computer system can select a software version or configuration that provides the functions needed to support the customized set of data objects and configuration data of the first server environment.

Based on the evaluation, the computer system can identify software modules within the second version of the application that were affected by one or more errors. The computer system can then use the identified errors to notify an administrator for the first server environment, to change configuration data, to select a version of the application for the first server environment, etc.

In some implementations, the computer system can initiate (or provide a recommendation and user interface element for an administrator to initiate) a conversion process or standardization process to bring non-standard or incompatible data objects into compliance for the second version of the application. In response to finding that an action involving a data object resulted in an error or incorrect result, the computer system can initiate a corrective action to change formatting, add metadata, or otherwise update the data object to achieve compatibility. In some implementations, based on the evaluating the results, the computer system may identify, remove, or correct one or more portions of the data associated with an error. This can involve noting one or more aspects of configuration of the first server environment that should not be transferred in an upgrade, altering a setting of the first server environment, altering a data object or link between data objects, etc.

The computer system may annotate the development codebase for the second version of the application based on errors, incompatibilities, performance decreases, or other items noted. This can provide a feedback mechanism where testing of the customized configuration and data objects of different installations of the application can signal areas to update the application functionality or even specific code of the application. Performing this process across the installations of many different servers or customers can enable updates to make the second version or a later version of the application more robust and compatible for upgrades.

The computer system can send a message to a client device for an administrator of the first server environment, for example, to indicate that the second version is compatible or incompatible with the configuration and data objects used in the first server environment. The message can be a notification, alert, content on an application, an e-mail, a report or other document, or another form of message. The message can indicate performance changes that were experienced in testing or are expected if the second version are used. The message can identify specific data objects (e.g., data sets, reports, files, etc.) and indicate whether they are compatible with the new version of the application. For items that are not compatible, a portion or reason for incompatibility may be noted (e.g., noting a parameter outside a required range, a dependency not satisfied, a function not available in the second version, an access control or security permissions issue, etc.).

The message can include recommendations, generated by the computer system of changes to the first version of the application or to data objects that are needed to prepare for installation of the second version. These may be settings to change in the first version of the application, conversions of files that may need to be performed to ensure compatibility, changes to hardware configurations (e.g., more memory, storage space, network bandwidth, etc.) needed for high performance, and so on.

In general, the computer system may provide a list of data objects, software functionality, or other elements that are not expected to work. The computer system can store mapping data that indicates typical causes of different types of errors and incompatibilities. Using the mapping data, the computer system can look up likely causes of errors and solutions, and indicate both causes and recommended solutions to a user. The computer system may automatically implement various solutions in some implementations, such as by implementing configuration changes, standardizing data objects, etc.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   obtaining (i) configuration data indicating a configuration of a first server environment running a third-party installation of a first version of an application and (ii) one or more data sets of the first server environment comprising data stored by or accessed by the first server environment; and
   testing compatibility of a second version of the application with the configuration of the first server environment and the one or more data sets of the first server environment by:
      simulating the first server environment by generating a second server environment in a cloud-computing platform based on the configuration data for the first server environment, wherein the second server environment is configured to run the first version of the application, the second server environment being configured to use a set of configuration settings for the first server environment that are indicated by the configuration data for the first server environment;
      running an installer for a second version of the application to transition the second server environment to the second version of the application; and
      after running the installer to update the second server environment to the second version of the application, evaluating capabilities of the second version of the application using a series of tests for the application on the second server environment using the one or more data sets of the first server environment, wherein evaluating the capabilities of the second version of the application comprises:
         determining one or more tasks to perform in the series of tests based on usage log data for the first server environment, wherein the usage log data indicates user-initiated tasks performed by the first server environment using the first version of the application;
         performing the determined one or more tasks with the second version of the application in the second server environment; and evaluating results of performing the determined one or more tasks with the second version of the application in the second server environment.

2. The method of claim 1, wherein the series of tests includes a test that evaluates integrity of relationships within the one or more data sets when accessed by the second version of the application running in the second server environment, the evaluating comprising:
   identifying a set of data objects referenced in the one or more data sets;
   identifying, for each of the identified data objects, a set of operations performable for the data object;
   initiating, for each of the identified data objects, performance of each operation in the set of operations; and
   determining, for each of the identified data objects, which operations completed successfully.

3. The method of claim 1, wherein the series of tests includes a test that evaluates performance characteristics of the second version of the application in the second server environment by evaluating at least one of speed, capacity, reliability, or resource utilization of the second server environment.

4. The method of claim 3, wherein the performance characteristics comprise at least one of response time, task completion time, capacity to support current users, processor utilization, memory utilization, or communication bandwidth utilization.

5. The method of claim 1, wherein the series of tests involves using the second server environment to perform functions that are included in the second version of the application and that are not available to be performed using the first version of the application.

6. The method of claim 1, wherein the series of tests involve progressions of operations using randomly or pseudo-randomly selected features of the second version of the application.

7. The method of claim 6, wherein evaluating capabilities of the second version of the application comprises continuing to initiate operations selected in a randomly or pseudo-randomly selected manner to cause the second version of the application to crash.

8. The method of claim 1, further comprising:
   evaluating the results from the series of tests; and
   based on the evaluation, identifying, removing, or correcting one or more portions of the one or more data sets of the first server environment that are associated with an error when used by the second version of the application in the second server environment.

9. The method of claim 1, comprising extracting one or more workflows from usage logs for the first server environment, wherein the one or more workflows include a sequence of tasks performed using the first server environment or simulate typical usage of the application in the first server environment;
  wherein the series of tests comprises performing the extracted workflows, using the second version of the application in the second server environment, using the one or more data sets of the first server environment.

10. The method of claim 1, comprising selecting between different versions or configurations of the application for first server environment based on the results of the series of tests performed in the second server environment.

11. The method of claim 1, comprising, based on the results of the series of tests, identifying one or more actions to improve compatibility of the first server environment with the second version of the application.

12. The method of claim 1, comprising notifying a user of one or more incompatibilities between the first server environment or the one or more data sets with the second version of the application.

13. A system comprising:
  one or more computers and one or more computer-readable media storing instructions that, when executed by the one or more computers, cause the one or more computers to perform instructions comprising:
    obtaining (i) configuration data indicating a configuration of a first server environment running a third-party installation of a first version of an application and (ii) one or more data sets of the first server environment comprising data stored by or accessed by the first server environment; and
    testing compatibility of a second version of the application with the configuration of the first server environment and the one or more data sets of the first server environment by:
      simulating the first server environment by generating a second server environment in a cloud-computing platform based on the configuration data for the first server environment, wherein the second server environment is configured to run the first version of the application, the second server environment being configured to use a set of configuration settings for the first server environment that are indicated by the configuration data for the first server environment;
      running an installer for a second version of the application to transition the second server environment to the second version of the application; and
      after running the installer to update the second server environment to the second version of the application, evaluating capabilities of the second version of the application using a series of tests for the application on the second server environment using the one or more data sets of the first server environment, wherein evaluating the capabilities of the second version of the application comprises:
        determining one or more tasks to perform in the series of tests based on usage log data for the first server environment, wherein the usage log data indicates user-initiated tasks performed by the first server environment using the first version of the application;
        performing the determined one or more tasks with the second version of the application in the second server environment; and
        evaluating results of performing the determined one or more tasks with the second version of the application in the second server environment.

14. The system of claim 13, wherein the series of tests includes a test that evaluates integrity of relationships within the one or more data sets, the evaluating comprising:
  identifying a set of data objects referenced in the one or more data sets;
  identifying, for each of the identified data objects, a set of operations performable for the data object;
  initiating, for each of the identified data objects, performance of each operation in the set of operations; and
  determining, for each of the identified data objects, which operations completed successfully.

15. The system of claim 13, wherein the series of tests includes a test that evaluates performance characteristics of the second server environment by evaluating at least one of speed, capacity, reliability, or resource utilization of the second server environment.

16. The system of claim 13, wherein the series of tests evaluate results of operations that usage log data for the first server environment indicates were previously performed using the first server environment.

17. The system of claim 13, wherein the series of tests evaluate results of operations that are not available to be performed using the first version of the application.

18. The system of claim 13, wherein the series of tests involve progressions of randomly or pseudo-randomly selected features of the application.

19. One or more non-transitory computer-readable media storing a computer program, the program comprising instructions that when executed by one or more processing devices cause the one or more processing devices to perform operations comprising:
  obtaining (i) configuration data indicating a configuration of a first server environment running a third-party installation of a first version of an application and (ii) one or more data sets of the first server environment comprising data stored by or accessed by the first server environment; and
  testing compatibility of a second version of the application with the configuration of the first server environment and the one or more data sets of the first server environment by:
    simulating the first server environment by generating a second server environment in a cloud-computing platform based on the configuration data for the first server environment, wherein the second server environment is configured to run the first version of the application, the second server environment being configured to use a set of configuration settings for the first server environment that are indicated by the configuration data for the first server environment;
    running an installer for a second version of the application to transition the second server environment to the second version of the application; and
    after running the installer to update the second server environment to the second version of the application, evaluating capabilities of the second version of the application using a series of tests for the application on the second server environment using the one or more data sets of the first server environment, wherein evaluating the capabilities of the second version of the application comprises:

determining one or more tasks to perform in the series of tests based on usage log data for the first server environment, wherein the usage log data indicates user-initiated tasks performed by the first server environment using the first version of the application;

performing the determined one or more tasks with the second version of the application in the second server environment; and evaluating results of performing the determined one or more tasks with the second version of the application in the second server environment.

* * * * *